US012770587B2

(12) United States Patent
Xu et al.

(10) Patent No.: US 12,770,587 B2
(45) Date of Patent: Oct. 20, 2026

(54) DRIVING CIRCUIT AND DRIVING METHOD OF DRIVING CIRCUIT

(71) Applicants: Huizhou China Star Optoelectronics Display Co., Ltd., Huizhou (CN); TCL China Star Optoelectronics Technology Co., Ltd., Shenzhen (CN)

(72) Inventors: Fengcheng Xu, Huizhou (CN); Jinfeng Liu, Huizhou (CN)

(73) Assignees: Huizhou China Star Optoelectronics Display Co., Ltd., Huzhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 191 days.

(21) Appl. No.: 17/602,795

(22) PCT Filed: Jul. 26, 2021

(86) PCT No.: PCT/CN2021/108442
§ 371 (c)(1),
(2) Date: Nov. 14, 2024

(87) PCT Pub. No.: WO2023/272840
PCT Pub. Date: Jan. 5, 2023

(65) Prior Publication Data

US 2025/0069561 A1 Feb. 27, 2025

(30) Foreign Application Priority Data

Jun. 30, 2021 (CN) ......................... 202110733950.5

(51) Int. Cl.
*G09G 3/36* (2006.01)
*G09G 3/20* (2006.01)

(52) U.S. Cl.
CPC ......... *G09G 3/3611* (2013.01); *G09G 3/2007* (2013.01); *G09G 2320/0252* (2013.01); (Continued)

(58) Field of Classification Search
None
See application file for complete search history.

(56) References Cited

U.S. PATENT DOCUMENTS 5,574,475 A * 11/1996 Callahan, Jr. ........ G09G 3/2011 345/100
7,030,842 B2 * 4/2006 Ha ....................... G09G 3/3233 345/82

(Continued)

FOREIGN PATENT DOCUMENTS

CN 101071207 A 11/2007
CN 101290756 A 10/2008

(Continued)

*Primary Examiner* — Andre L Matthews
(74) *Attorney, Agent, or Firm* — Nathan & Associates; Menachem Nathan

(57) ABSTRACT

The present invention provides a driving circuit and a driving method of the driving circuit, which includes a plurality of circuit units each including a first resistor and a second resistor, in which the resistance of the first resistor is less than the resistance of the second resistor, the plurality of circuit units divide a plurality of first reference voltages into a plurality of divided voltages corresponding to a plurality of grayscales, and the divided voltages are provided for the pixel units; and a controller, configured to select the second resistor of a selected circuit unit to be connected when the pixel unit needs to be driven by a second reference voltage.

17 Claims, 4 Drawing Sheets

(52) U.S. Cl.
CPC ............... *G09G 2320/0257* (2013.01); *G09G 2330/021* (2013.01)

(56) References Cited

U.S. PATENT DOCUMENTS

| | | | | |
|---|---|---|---|---|
| 2003/0151578 | A1* | 8/2003 | Morita ................. | G09G 3/2011 345/89 |
| 2004/0140985 | A1* | 7/2004 | Liaw .................... | G09G 3/3696 345/690 |
| 2005/0062736 | A1 | 3/2005 | Ha et al. | |
| 2006/0214895 | A1* | 9/2006 | Shih ..................... | G09G 3/3696 345/88 |
| 2008/0122820 | A1 | 5/2008 | Umeda et al. | |
| 2009/0102691 | A1 | 4/2009 | Chang | |
| 2009/0153593 | A1* | 6/2009 | Lee ...................... | G09G 3/3696 345/690 |
| 2015/0170609 | A1 | 6/2015 | Jung | |

FOREIGN PATENT DOCUMENTS

| | | | |
|---|---|---|---|
| CN | 107705746 | A | 2/2018 |
| CN | 110033735 | A | 7/2019 |
| CN | 110556077 | A | 12/2019 |
| CN | 113035149 | A | 6/2021 |
| KR | 20080048732 | A | 6/2008 |
| WO | 2016026149 | A1 | 4/2009 |

* cited by examiner

DRIVING CIRCUIT AND DRIVING METHOD OF DRIVING CIRCUIT

FIELD OF THE DISCLOSURE

The present invention relates to a display panel technology, and more particularly to a driving circuit and a driving method of a driving circuit.

DESCRIPTION OF RELATED ARTS

In order to avoid ghosting caused in a screen of a liquid crystal display panel due to its lower liquid crystal response speed, during the liquid crystal display panel dynamically displays images, it usually applies to its pixel unit a voltage higher than a target pixel voltage when an image frame is displayed on the liquid crystal display panel, such that the pixel unit is over driven (OD), thereby achieving the purpose of reducing liquid crystal response time.

However, in the existing arts, when over driving is applied to the pixel units of the liquid crystal display panel, it needs to obtain an over-driving voltage value corresponding to a target pixel voltage of the pixel unit under a current frame by obtaining an OD lookup table stored in a timing controller (TCON) of the liquid crystal display panel.

For the display panels designed without having the timing controller, because their pixel units cannot be over driven, it will cause ghost images when displaying images using the display panels.

SUMMARY

Technical Problems

The present invention provides a driving circuit and a driving method of a driving circuit, which effectively solves the problem of ghost images caused when displaying images using a display panel, due to an inability to over drive pixel units of the display panel designed without having a timing controller.

Solution to Problem

Technical Solutions

In an aspect, the present invention provides a driving circuit, applied to a display panel, the display panel including pixel units and data lines, the driving circuit including:

- a plurality of circuit units connected in series, each of the circuit units including a plurality of voltage dividing resistors connected in parallel, wherein the plurality of voltage dividing resistors include a first resistor and a second resistor, a resistance of the first resistor is less than the resistance of the second resistor, the plurality of circuit units divide a plurality of first reference voltages into a plurality of divided voltages corresponding to a plurality of grayscales, and the divided voltages are provided for the pixel units via the data lines; and
- a controller, configured to select the first resistor of at least one selected circuit unit to be connected from the plurality of circuit units based on a current-frame grayscale of the data line, and select the second resistor of the selected circuit unit to be connected when the pixel unit needs to be driven by a second reference voltage.

Preferably, when there are a plurality of second resistors, the controller is further configured to determine a target voltage dividing resistor from the plurality of second resistors of the selected circuit unit based on a grayscale voltage difference between the current-frame grayscale and a previous-frame grayscale of the data line, and select the target voltage dividing resistor to be connected when the pixel unit needs to be driven by the second reference voltage.

Preferably, the controller is configured to determine the target voltage dividing resistor from the plurality of second resistors based on a voltage difference threshold corresponding to the grayscale voltage difference.

Preferably, there is at least one previous circuit unit having the first resistor that is connected under the previous-frame grayscale, and the controller is configured to calculate the grayscale voltage difference based on the first resistor of the previous circuit unit and the first resistor of the selected circuit unit.

Preferably, the resistance of the plurality of second resistors differs by a preset threshold and sequentially increases.

Preferably, when there are a plurality of selected circuit units, the controller is further configured to determine at least one target circuit unit from the plurality of selected circuit units based on a grayscale level difference between the current-frame grayscale and a previous-frame grayscale of the data line, and select the second resistor of the target circuit unit to be connected when the pixel unit needs to be driven by the second reference voltage.

Preferably, the controller is further configured to select the first resistor of the selected circuit unit to be connected after the pixel unit is driven by the second reference voltage and a voltage of the pixel unit arrives at a target pixel voltage value such that the pixel unit is driven by the divided voltage.

In another aspect, the present invention further provides a driving method of a driving circuit, applied to a display panel, the display panel including pixel units and data lines, the driving circuit including a plurality of circuit units connected in series, each of the circuit units including a plurality of voltage dividing resistors connected in parallel, the plurality of voltage dividing resistors including a first resistor and a second resistor, a resistance of the first resistor being less than the resistance of the second resistor, the driving method including:

- obtaining an over-driving instruction, which carries information indicating that the pixel unit needs to be over driven; and
- in response to the over-driving instruction, switching a connected voltage dividing resistor in a selected circuit unit under a current-frame grayscale from the first resistor to the second resistor such that the pixel unit is over driven.

Preferably, there are a plurality of second resistors, and the step of switching the connected voltage dividing resistor in the selected circuit unit under the current-frame grayscale from the first resistor to the second resistor includes:

- calculating a grayscale voltage difference between the current-frame grayscale and a previous-frame grayscale of the data line;
- determining a target voltage dividing resistor from the plurality of second resistors of the selected circuit unit under the current-frame grayscale based on the grayscale voltage difference; and
- switching the connected voltage dividing resistor in the selected circuit unit from the first resistor to a target voltage dividing resistor.

Preferably, there is at least one previous circuit unit having the first resistor that is connected under the previous-frame grayscale, and the step of calculating the grayscale voltage difference between the current-frame grayscale and the previous-frame grayscale of the data line includes:

calculating the grayscale voltage difference based on the first resistor of the previous circuit unit and the first resistor of the selected circuit unit.

Preferably, the step of determining the target voltage dividing resistor from the plurality of second resistors of the selected circuit unit under the current-frame grayscale based on the grayscale voltage difference includes:

determining a voltage difference threshold corresponding to the grayscale voltage difference; and determining the target voltage dividing resistor from the plurality of second resistors of the selected circuit unit under the current-frame grayscale based on the voltage difference threshold.

Preferably, the resistance of the plurality of second resistors differs by a preset threshold and sequentially increases.

Preferably, there are a plurality of selected circuit units, and the step of switching the connected voltage dividing resistor in the selected circuit unit under the current-frame grayscale from the first resistor to the second resistor includes:

calculating a grayscale level difference between the current-frame grayscale and a previous-frame grayscale of the data line;

determining at least one target circuit unit from the plurality of selected circuit units under the current-frame grayscale based on the grayscale level difference; and switching the connected voltage dividing resistor in the target circuit unit from the first resistor to the second resistor.

Preferably, after the step of switching, in response to the over-driving instruction, the connected voltage dividing resistor in the selected circuit unit under the current-frame grayscale from the first resistor to the second resistor such that the pixel unit is over driven, the method further including:

arriving, by a voltage of the pixel unit, at a target pixel voltage value; and switching the connected resistor in the selected circuit unit from the second resistor to the first resistor.

In another aspect, the present invention further provides a mobile terminal, including a driving circuit applied to a display panel, the display panel including pixel units and data lines, the driving circuit including:

a plurality of circuit units connected in series, each of the circuit units including a plurality of voltage dividing resistors connected in parallel, wherein the plurality of voltage dividing resistors include a first resistor and a second resistor, a resistance of the first resistor is less than the resistance of the second resistor, the plurality of circuit units divide a plurality of first reference voltages into a plurality of divided voltages corresponding to a plurality of grayscales, and the divided voltages are provided for the pixel units via the data lines; and a controller, configured to select the first resistor of at least one selected circuit unit to be connected from the plurality of circuit units based on a current-frame grayscale of the data line, and select the second resistor of the selected circuit unit to be connected when the pixel unit needs to be driven by a second reference voltage.

Preferably, when there are a plurality of second resistors, the controller is further configured to determine a target voltage dividing resistor from the plurality of second resistors of the selected circuit unit based on a grayscale voltage difference between the current-frame grayscale and a previous-frame grayscale of the data line, and select the target voltage dividing resistor to be connected when the pixel unit needs to be driven by the second reference voltage.

Preferably, the controller is configured to determine the target voltage dividing resistor from the plurality of second resistors based on a voltage difference threshold corresponding to the grayscale voltage difference.

Preferably, there is at least one previous circuit unit having the first resistor that is connected under the previous-frame grayscale, and the controller is configured to calculate the grayscale voltage difference based on the first resistor of the previous circuit unit and the first resistor of the selected circuit unit.

Preferably, the resistance of the plurality of second resistors differs by a preset threshold and sequentially increases.

Preferably, when there are a plurality of selected circuit units, the controller is further configured to determine at least one target circuit unit from the plurality of selected circuit units based on a grayscale level difference between the current-frame grayscale and a previous-frame grayscale of the data line, and select the second resistor of the target circuit unit to be connected when the pixel unit needs to be driven by the second reference voltage.

Advantages of Invention

Beneficial Effects

The present invention provides a driving circuit 10 and a driving circuit 20 applied to a display panel, the display panel including pixel units and data lines, and the driving circuit includes: a plurality of circuit units connected in series and a controller, wherein each of the circuit units includes a plurality of voltage dividing resistors connected in parallel, the plurality of voltage dividing resistors include a first resistor and a second resistor, a resistance of the first resistor is less than the resistance of the second resistor, the plurality of circuit units divide a plurality of first reference voltages into a plurality of divided voltages corresponding to a plurality of grayscales, the divided voltages are provided for the pixel units via the data lines, and the controller is configured to select the first resistor of at least one selected circuit unit to be connected from the plurality of circuit units based on a current-frame grayscale of the data line, and select the second resistor of the selected circuit unit to be connected when the pixel unit needs to be driven by a second reference voltage. In the driving circuits provided in the present invention, since the second resistor having resistance greater than the resistance of the first resistor is added in each circuit unit, the purpose of driving the pixel unit by the second reference voltage is achieved by switching the voltage dividing resistors in the circuit units when the pixel unit needs to be driven by the second reference voltage.

BRIEF DESCRIPTION OF DRAWINGS

Description of Attached Drawings

For explaining the technical solutions used in the embodiments of the present invention more clearly, the appended figures to be used in describing the embodiments will be briefly introduced in the following. Obviously, the appended figures described below are only some of the embodiments of the present invention, and those of ordinary skill in the art can further obtain other figures according to these figures without making any inventive effort.

EMBODIMENTS OF INVENTION

Detailed Description of Preferred Embodiments

Figure 1:
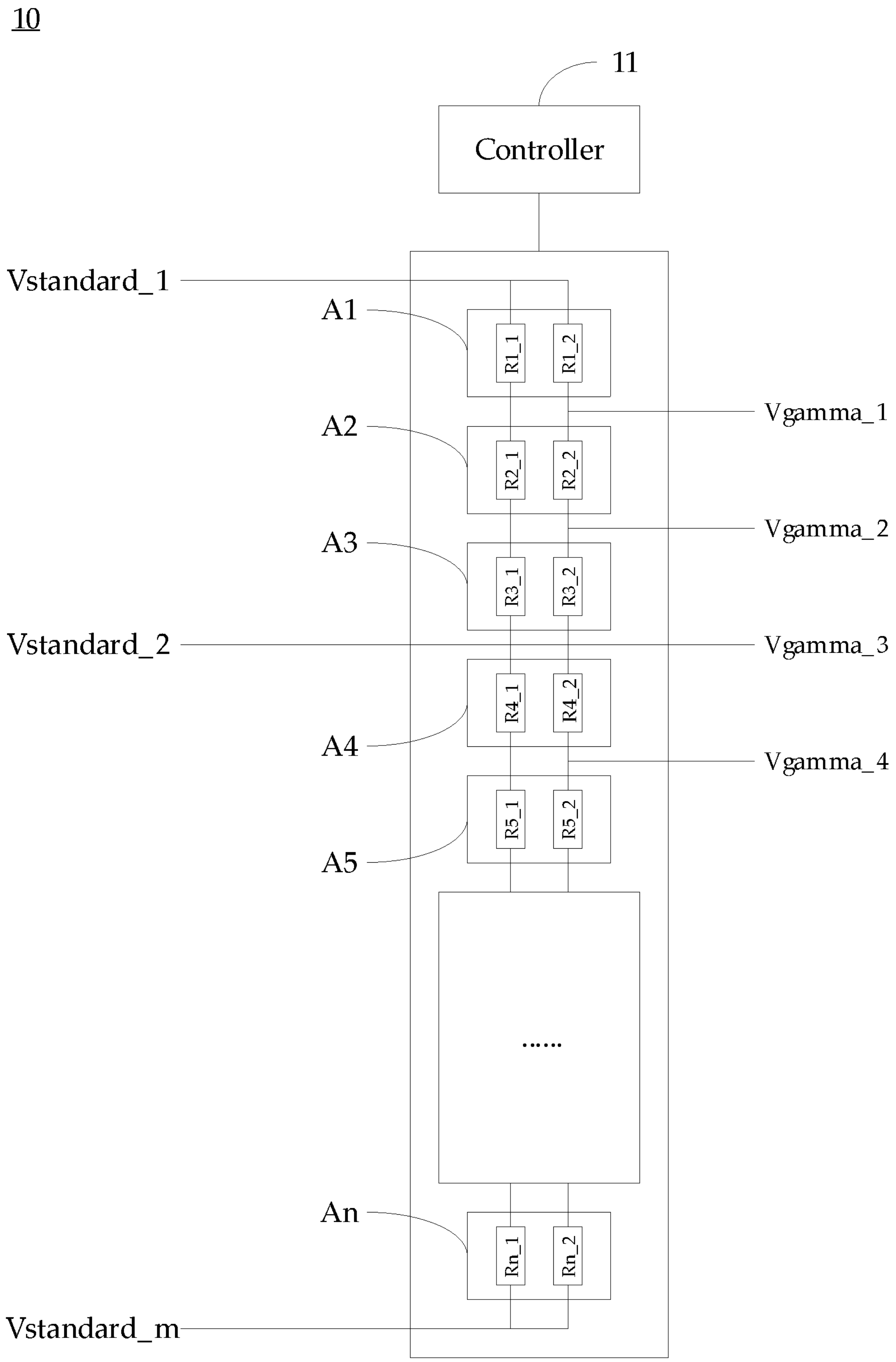
FIG. 1 is a structural schematic diagram illustrating a driving circuit provided in a first embodiment based on the present invention.

The technical solutions in the embodiments of the present invention will be clearly and completely described below with reference to accompanying drawings of the embodiments of the present invention. Obviously, the described embodiments are merely a part of embodiments of the present invention and are not all of the embodiments. Based on the embodiments of the present invention, other embodiments obtained by those of ordinary skill in the art without making any inventive effort are within the scope the present invention seeks to be protected.

In the description of the present invention, it is to be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise" and the like indicated orientation or positional relationship are based on the relationship of the position or orientation shown in the drawings, which is only for the purpose of facilitating description of the present invention and simplifying the description, but is not intended to or implied that the device or element referred to must have a specific orientation, and be constructed and operated in a particular orientation. Therefore, it should not be construed as a limitation of the present invention. In addition, the terms "first" and "second" are used for descriptive purposes only, and should not be taken to indicate or imply relative importance, or implicitly indicate the indicated number of technical features. Thus, by defining a feature with "first" or "second", it may explicitly or implicitly include one or more features. In the description of the present invention, "a plurality" means two or more unless explicitly defined.

In the description of the present invention, it should be noted that unless otherwise explicitly specified or limited, the terms "installed", "connected", and "connection" should be construed broadly, for example, a fixed connection, a removable connection, or integrally connected. These terms may be a mechanical connection, and may also be an electrical connection or communication. Moreover, these terms can be directly attached, be indirectly connected through an intermediate medium, and may be internally communicated with two components or the interaction relationship between two components. For persons skilled in the art, they can understand the specific meaning of the terms in the present invention based on specific conditions.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

The following disclosure provides a plurality of different embodiments or examples to implement different structures of the present invention. To simplify the disclosure of the present invention, the following describes components and settings in particular examples. Certainly, the examples are merely for illustrative purposes, and are not intended to limit the present invention. In addition, in the present invention, reference numerals and/or reference letters may be repeated in different examples. This repetition is for the purpose of simplicity and clarity, and does not in itself indicate a relationship between the various embodiments and/or settings that are discussed. In addition, the present invention provides examples of various particular processes and materials, but a person of ordinary skill in the art will recognize that other processes and/or materials may be applied and/or used.

In the existing arts, for a display panel designed without having a timing controller, pixel units of the display panel cannot be over driven and as a result, this causes ghosting in a screen when displaying images using the display panel. The embodiments established based on the present invention are used to solve this problem.

FIG. 1 is a structural schematic diagram illustrating a driving circuit 10 provided in a first embodiment based on the present invention. The driving circuit 10 is applied to a display panel including data lines and pixel units. It can be seen intuitively from FIG. 1 that each component and the positional relationship between the components are provided in the first embodiment based on the present invention.

As shown in FIG. 1, the driving circuit 10 includes a plurality of circuit units (circuit unit A1 to circuit unit An) connected in series and a controller 11. The components constituting the driving circuit 10 will be described in details below.

Each circuit unit includes a plurality of voltage dividing resistors connected in parallel. The plurality of voltage dividing resistors include a first resistor and a second resistor. The resistance of the first resistor is less than the resistance of the second resistor. Taking the circuit unit A1 for example, the circuit unit A1 includes a voltage dividing resistor R1_1 and a voltage dividing resistor R1_2 that are connected in parallel. The voltage dividing resistor R1_1 is the first resistor of the circuit unit A1, the voltage dividing resistor R1_2 is the second resistor of the circuit unit A1, and the resistance of the voltage dividing resistor R1_1 is less than the resistance of the voltage dividing resistor R1_2.

The plurality of circuit units (circuit unit A1 to circuit unit An) divide a plurality of first reference voltages (Vstandard_1 to Vstandard_m) into a plurality of divided voltages (Vgamma_1 to Vgamma_n) corresponding to a plurality of grayscales (grayscale 1 to grayscale N). After that, the divided voltages will be provided for the pixel units via the data lines on the display panel.

It needs to be noted that the first reference voltages are voltages obtained by dividing a power voltage VDD via a series of fundamental GAMMA resistor networks.

The controller 11 will select the first resistor of at least one selected circuit unit to be connected from the plurality of circuit units based on a current-frame grayscale of the data line, and select the second resistor of the selected circuit unit to be connected when the pixel unit needs to be driven by a second reference voltage. For example, when the current-frame grayscale on the data line of the display panel is grayscale 2, the controller will select the first resistor of the circuit unit A1 and the circuit unit A2 to be connected (meanwhile, the circuit unit A1 and the circuit unit A2 are the selected circuit units). That is, the voltage dividing resistor R1_1 and the voltage dividing resistor R2_1 are connected or conductive such that the driving circuit 10 outputs a divided voltage Vgamma_2 to the pixel unit of the display panel. In order to avoid ghost images caused on a screen of the display panel due to low speed of liquid crystal response of the pixel unit such that it needs to make the pixel unit be driven by the second reference voltage to reduce its liquid crystal response time, the display panel will send to the driving circuit 10 a related instruction indicating that the pixel unit needs to be driven by the second reference voltage. In response to the instruction, the driving circuit 10 will make the second resistor of the circuit unit A1 and the circuit unit A2 be connected or conductive. That is, the voltage dividing resistor R1_2 and the voltage dividing resistor R2_2 are connected or conductive such that the driving circuit 10 outputs the second reference voltage to the pixel unit of the display panel. Since the resistance of the voltage dividing resistor R1_1 is less than the resistance of the voltage dividing resistor R1_2 and the resistance of the voltage dividing resistor R2_1 is less than the resistance of the voltage dividing resistor R2_2, the voltage value of the dived voltage Vgamma_2 is less than the voltage value of the second reference voltage. Therefore, the pixel unit is changed from being driven by the divided voltage Vgamma_2 to being driven by the second reference voltage.

Figure 2:
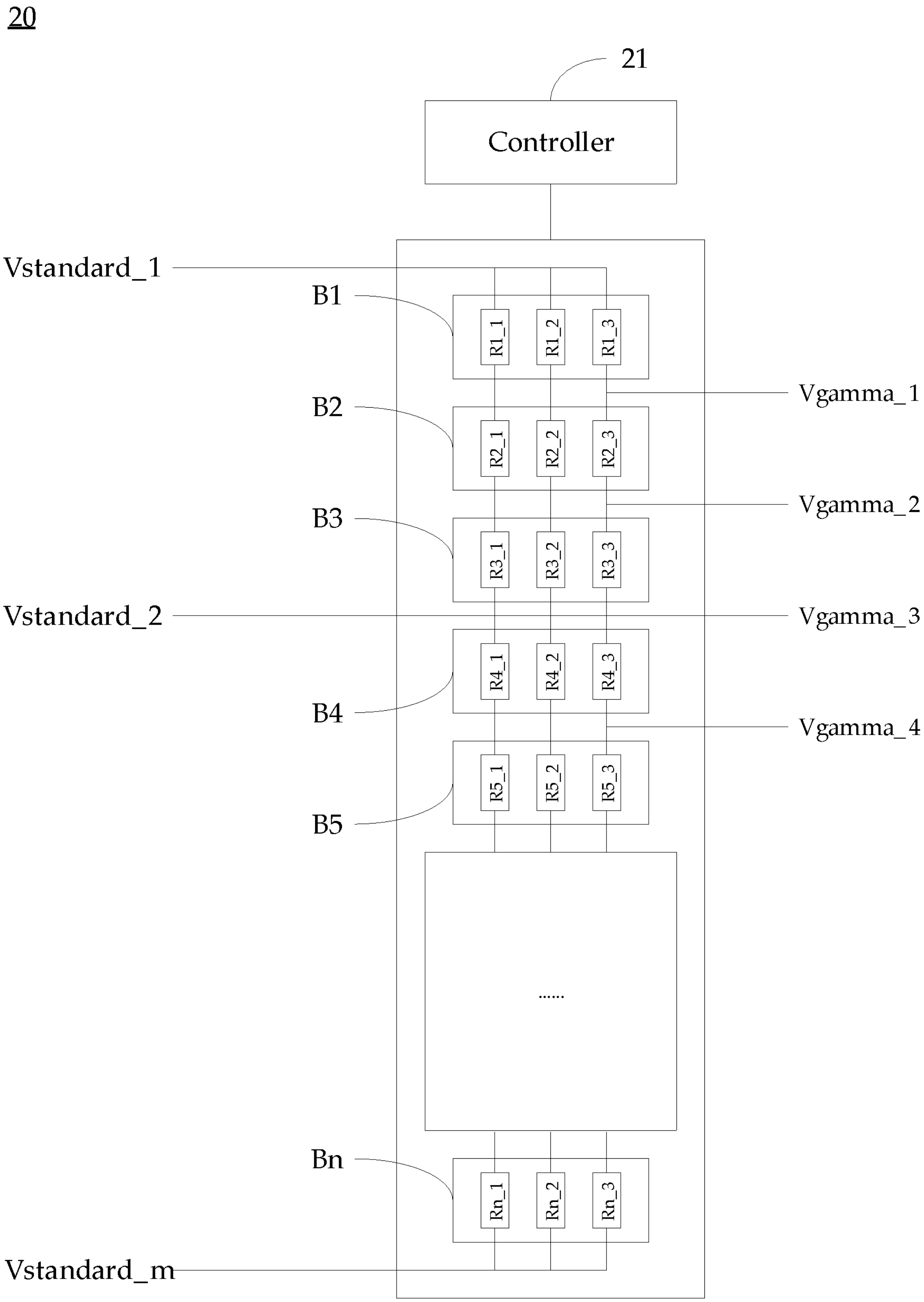
FIG. 2 is a structural schematic diagram illustrating a driving circuit provided in a second embodiment based on the present invention.

FIG. 2 is a structural schematic diagram illustrating a driving circuit 20 provided in a second embodiment based on the present invention. The driving circuit 20 is applied to a display panel including data lines and pixel units. It can be seen intuitively from FIG. 2 that each component and the positional relationship between the components are provided in the first embodiment based on the present invention.

As shown in FIG. 2, the second embodiment is substantially as the same as the first embodiment in terms of structure. The function and deployed position of the plurality of circuit units (including circuit unit B1 to circuit unit Bn) in the second embodiment and the plurality of circuit units (including circuit unit A1 to circuit unit An) in the first embodiment are same. The function and deployed position of the controller 21 in the second embodiment and the controller 11 in the first embodiment are same. The difference is that in the present embodiment there are a plurality of second resistors in each circuit unit. For example, in the first embodiment the second resistor of the circuit unit A1 is the voltage dividing resistor R1_2 while the second resistor of the circuit unit B1 includes a voltage dividing resistor R1_2 and a voltage dividing resistor R1_3 in the present embodiment.

It needs to be noted that in the present embodiment the controller will determine a target voltage dividing resistor from the plurality of second resistors of the selected circuit unit based on a grayscale voltage difference between the current-frame grayscale and a previous-frame grayscale of the data line, and select the target voltage dividing resistor to be connected when the pixel unit needs to be driven by the second reference voltage. Next, it is assumed that the previous-frame grayscale on the data line is grayscale 2, the current-frame grayscale is grayscale 3, and the grayscale voltage difference between the grayscale 2 and the grayscale 3 is V1. When the pixel unit displays a previous frame and is driven by the divided voltage Vgamma_2, the circuit unit B1 and the circuit unit B2 are previous circuit units and their first resistors (i.e., the voltage dividing resistor R1_1 and the voltage dividing resistor R2_1) are connected. When the pixel unit displays a current frame and is driven by a divided voltage Vgamma_3, the circuit unit B1, the circuit unit B2 and the circuit unit B3 are selected circuit units and their first resistors (i.e., the voltage dividing resistor R1_1, the voltage dividing resistor R2_1 and the voltage dividing resistor R2_1) are connected. When the display panel sends to the driving circuit 20 a related instruction indicating that the pixel unit needs to be driven by the second reference voltage, the driving circuit responses to the instruction and determines a target voltage dividing resistor (for example, the determined target voltage dividing resistor includes the voltage dividing resistor R1_3, the voltage dividing resistor R2_3 and the voltage dividing resistor R3_3) suitable for the grayscale voltage difference V1 from the plurality of second resistors of a plurality of selected circuit units based on the grayscale voltage difference between the grayscale 2 and the grayscale 3. Then, the connected voltage dividing resistors are switched from the voltage dividing resistor R1_1, the voltage dividing resistor R2_1 and the voltage dividing resistor R3_1 to the voltage dividing resistor R1_3, the voltage dividing resistor R2_3 and the voltage dividing resistor R3_3 such that the pixel unit is changed from being driven by the divided voltage Vgamma_3 to being driven by the second reference voltage.

Specifically, the grayscale voltage difference V1 may be calculated based on the first resistor (i.e., the voltage dividing resistor R1_1 and the voltage dividing resistor R2_1) of the previous circuit unit and the first resistor (i.e., the voltage dividing resistor R1_1, the voltage dividing resistor R2_1 and the voltage dividing resistor R3_1) of the selected circuit unit.

It needs to be noted that the controller 21 may determine the target voltage dividing resistor from the plurality of second resistors based on a voltage difference threshold corresponding to the grayscale voltage difference. For example, if the grayscale voltage difference V1 between the grayscale 2 and the grayscale 3 corresponds to a voltage difference threshold 1, the target voltage dividing resistor includes the voltage dividing resistor R1_2, the voltage dividing resistor R2_2 and the voltage dividing resistor R3_2; if the grayscale voltage difference V1 between the grayscale 2 and the grayscale 3 corresponds to a voltage difference threshold 2, the target voltage dividing resistor includes the voltage dividing resistor R1_3, the voltage dividing resistor R2_3 and the voltage dividing resistor R3_3, and so on. Further, it may also establish a lookup table recording a mapping relationship between the plurality of grayscale voltage differences and the plurality of target voltage dividing resistors, and directly look up the table and select the target voltage dividing resistor to be connected according to a result of the looking up when the pixel unit needs to be over driven.

Further, the resistance of the plurality of second resistors of each circuit unit differs by a preset threshold and sequentially increases. Taking the plurality of voltage dividing resistors of the circuit unit B1 for example, the resistance of the voltage dividing resistor R1_1 and the voltage dividing resistor R2_1 differs by RX and the resistance of the voltage dividing resistor R2_1 and the voltage dividing resistor R3_1 also differs by RX.

It needs to be noted that in order to reduce the power consumption generated by the display panel in driving the pixel units, when there are a plurality of selected circuit units (that is, there will have a plurality of selected circuit units under all grayscales except the grayscale 1), the controller 21 will determine at least one target circuit unit from the plurality of selected circuit units based on a grayscale level difference between the current-frame grayscale and a previous-frame grayscale of the data line, and select the second resistor of the target circuit unit to be connected when the pixel unit of the display panel needs to be driven by the second reference voltage. For example, it is assumed that the previous-frame grayscale on the data line is grayscale 2, the current-frame grayscale is grayscale 3, and the grayscale level difference between the current-frame grayscale and the previous-frame grayscale is 1. At this time, if the pixel unit needs to be over driven, the controller will determine a target circuit unit from the plurality of selected circuit units, that is, determine the circuit unit B1 as the target circuit unit from the circuit unit B1, the circuit unit B2 and the circuit unit B3, and select the second resistor of the circuit unit B1 to be connected.

Further, the number of the target circuit units corresponds to a value corresponding to the grayscale level difference, and the target circuit unit in the circuit unit B1, the circuit unit B2 and the circuit unit B3 can be determined based on the grayscale voltage difference V1 between the grayscale 2 and the grayscale 3.

It is easy to be understood that after the pixel unit is driven by the second reference voltage and the voltage of the pixel unit arrives at a target pixel voltage value, the controller will select the first resistor of the selected circuit unit to be connected such that the pixel unit is driven by a standard divided voltage. In this way, the power consumption generated by the display panel in driving the pixel units can be reduced.

It needs to be noted that in a specific embodiment, the circuit units serve as voltage dividing units in a GAMMA circuit; the first resistor is an original voltage dividing resistor; the second resistor is a to-be-selected voltage dividing resistor; the first reference voltage is a driving base voltage; the second reference voltage is an over-driving voltage; and the divided voltage is a gamma voltage.

Compared to the existing arts, the first embodiment and the second embodiment based on the present invention provide a driving circuit 10 and a driving circuit 20 applied to a display panel, the display panel including pixel units and data lines, and the driving circuit includes: a plurality of circuit units connected in series and a controller, wherein each of the circuit units includes a plurality of voltage dividing resistors connected in parallel, the plurality of voltage dividing resistors include a first resistor and a second resistor, a resistance of the first resistor is less than the resistance of the second resistor, the plurality of circuit units divide a plurality of first reference voltages into a plurality of divided voltages corresponding to a plurality of grayscales, the divided voltages are provided for the pixel units via the data lines, and the controller is configured to select the first resistor of at least one selected circuit unit to be connected from the plurality of circuit units based on a current-frame grayscale of the data line, and select the second resistor of the selected circuit unit to be connected when the pixel unit needs to be driven by a second reference voltage. In the driving circuits provided in the present invention, since the second resistor having resistance greater than the resistance of the first resistor is added in each circuit unit, the purpose of driving the pixel unit by the second reference voltage is achieved by switching the voltage dividing resistors in the circuit units when the pixel unit needs to be driven by the second reference voltage.

Figure 3:
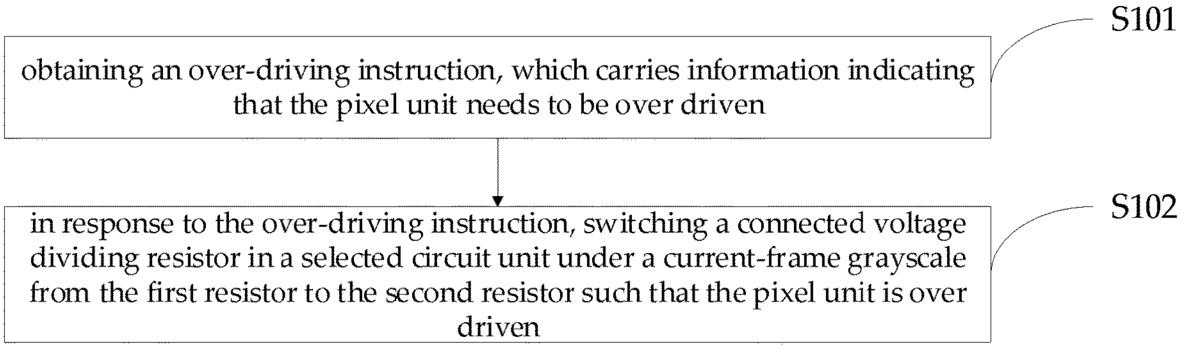
FIG. 3 is a schematic flowchart of a driving method of a driving circuit provided in an embodiment based on the present invention.

FIG. 3 is a schematic flowchart of a driving method of a driving circuit provided in an embodiment based on the present invention. The driving method is applicable to the driving circuit 10 and the driving circuit 20. Specifically, the flowchart of the driving method may be described below.

In an obtaining step S101, an over-driving instruction is obtained, wherein the over-driving instruction carries information indicating that the pixel unit needs to be over driven; and In a response step S102, in response to the over-driving instruction, a connected voltage dividing resistor in a selected circuit unit under a current-frame grayscale is switched from the first resistor to the second resistor such that the pixel unit is over driven.

Further, when there are a plurality of second resistors, the response step S102 may include:

- calculating a grayscale voltage difference between the current-frame grayscale and a previous-frame grayscale of the data line;
- determining a target voltage dividing resistor from the plurality of second resistors of the selected circuit unit under the current-frame grayscale based on the grayscale voltage difference; and
- switching the connected voltage dividing resistor in the selected circuit unit from the first resistor to a target voltage dividing resistor.

Further, when there are a plurality of selected circuit units, the response step S102 may include:

- calculating a grayscale level difference between the current-frame grayscale and a previous-frame grayscale of the data line;
- determining at least one target circuit unit from the plurality of selected circuit units under the current-frame grayscale based on the grayscale level difference; and
- switching the connected voltage dividing resistor in the selected circuit unit from the first resistor to a target voltage dividing resistor.

Compared to the existing arts, the present invention provides a driving method of a driving circuit including obtaining an over-driving instruction, which carries information indicating that the pixel unit needs to be over driven; and after that, in response to the over-driving instruction, switching a connected voltage dividing resistor in a selected circuit unit under a current-frame grayscale from the first resistor to the second resistor such that the pixel unit is over driven. In the driving method of the driving circuit provided in the present invention, since the second resistor having resistance greater than the resistance of the first resistor is added in each circuit unit of the driving circuit, the purpose of driving the pixel unit by the second reference voltage is achieved by switching the voltage dividing resistors in the circuit units when the pixel unit needs to be driven by the second reference voltage.

Figure 4:
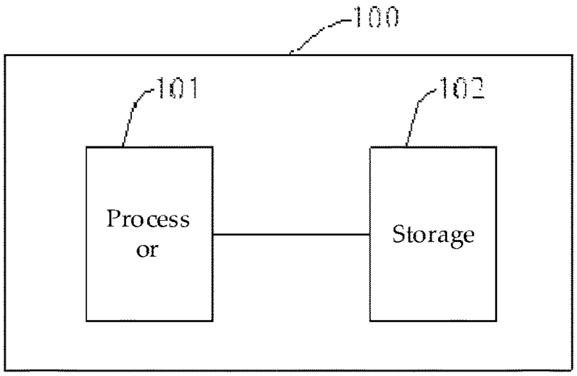
FIG. 4 is a structural schematic diagram illustrating a mobile terminal provided in an embodiment based on the present invention.

FIG. 4 is a structural schematic diagram illustrating a mobile terminal provided in an embodiment based on the present invention. The driving circuit 10 and the driving circuit 20 are applied to the mobile terminal. The mobile terminal may be a smartphone or a tablet computer. It can be seen intuitively from the figure that each component of the present invention and the positional relationship between the components.

As shown in FIG. 4, the mobile terminal 100 includes a processor 101 and a storage 102. The processor 101 and the storage 102 are electrically connected to each other.

The processor 101 functions as a control center of the mobile terminal 100 and is configured to connect each component of the mobile terminal using various interfaces and circuits, and is configured to execute or load application programs stored in the storage 102, to call the data stored in the storage 102 and to execute various functions of the mobile terminal and perform data processing, thereby monitoring the overall mobile terminal.

Figure 5:
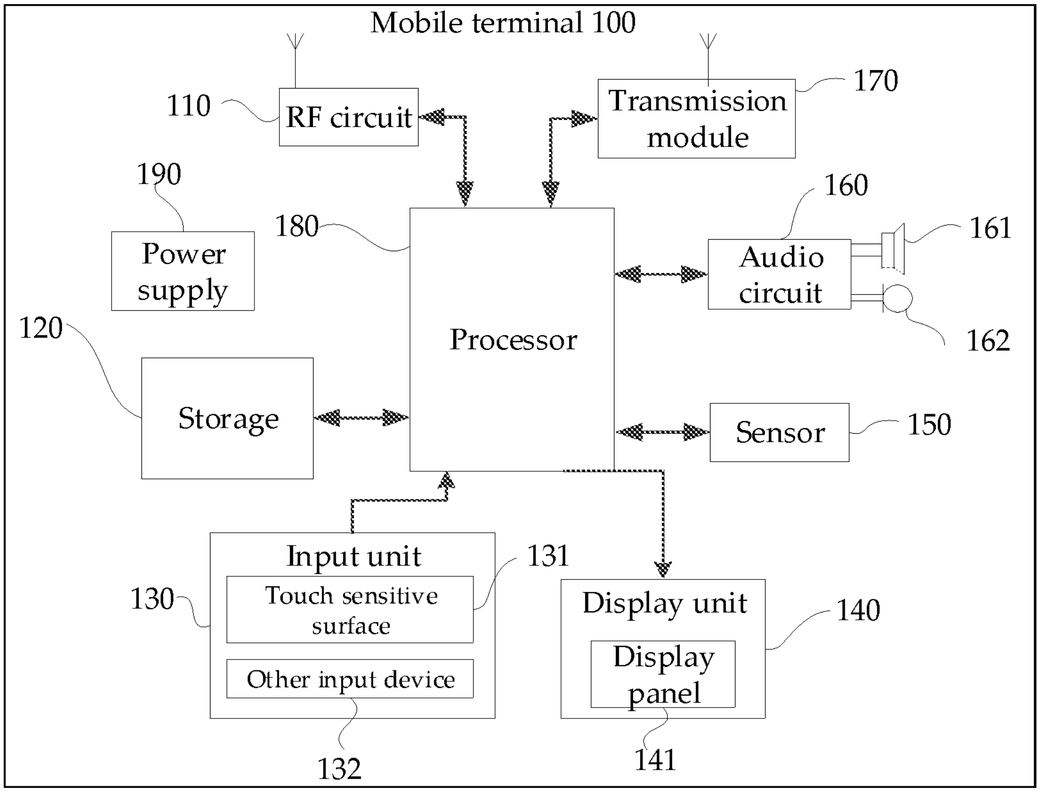
FIG. 5 is a structural schematic diagram illustrating detailed structure of a mobile terminal provided in an embodiment based on the present invention.

FIG. 5 is a structural schematic diagram illustrating a mobile terminal provided in an embodiment based on the present invention. The mobile terminal may be a smartphone or a tablet computer. It can be seen intuitively from the figure that each component of the present invention and the positional relationship between the components.

FIG. 5 illustrates a structural block diagram showing a mobile terminal 100 provided in an embodiment of the present invention. As shown in FIG. 5, the mobile terminal 100 may include a radio frequency (RF) circuit 110, a storage 120 including one or more than one computer-readable storage medium, an input unit 130, a display unit 140, a sensor 150, an audio circuit 160, a transmission module 170 (e.g., Wireless Fidelity (WiFi)), a processor 180 including one or more processing cores, a power supply 190, and etc. A person skilled in the art understands that the structure of the mobile terminal shown in FIG. 5 does not constitute a limitation to the mobile terminal, and may include more or less components than those illustrated in the drawings. Furthermore, some components of the mobile terminal can be combined and/or arranged in different ways other than that shown in FIG. 5.

The RF circuit 110 is configured to receive and transmit electromagnetic waves to implement conversion between the electromagnetic waves and electrical signals, thereby communicating with a communication network or any other device. The RF circuit 110 may include various existing circuit components for executing the functions, for example, an antenna, an RF transceiver, a digital signal processor, an encryption/decryption chip, a subscriber identity module (SIM) card, a storage, and so on. The RF circuit 110 can communicate with various networks, such as internet, an intranet, or a wireless network, or can communicate with other devices via the wireless network. The above-mentioned wireless network may include a cellular network or a wireless local area network or metropolitan area network. The above-mentioned wireless network may use any one of communication standards, protocols, or technologies, including but not limited to Global System for Mobile communications (GSM), Enhanced Data GSM Environment (EDGE), Wideband Code Division Multiple Access (WCDMA), Code Division Multiple Access (CDMA), Time Division Multiple Access (TDMA), WIFI (such as standards of the Institute of Electrical and Electronics Engineers including IEEE802.11a, IEEE802.11b, IEEE 802.11g, and/or IEEE 802.11n), Voice over Internet Protocol (VOIP), Worldwide Interoperability for Microwave Access (Wi-Max), any other protocol for mails, instant communication, and short messages, any other suitable communication protocol, or any other protocol which has not been developed.

The storage 120 can be configured to store software programs and modules, such as the program instructions corresponding to the audio power amplification control method. The processor 180 can perform various applications of functions and data processing by executing the software programs and modules stored in the storage 120 to implement obtaining the frequency of transmission signals of transmitted information of the mobile terminal 100. Generate interference signals. The storage 120 may include high-speed random access memory, and may further include non-volatile memory such as one or more disk storage devices, a flash memory, or other non-volatile solid state storage. In some embodiments, the storage 120 also includes a remote storage disposed corresponding to the processor 180. The remote storage may be linked to the mobile terminal 100 via a network. The network may include but not limited to at least one combination of internet, an intranet, a local area network, and a mobile communication network.

The input unit 130 can be configured to receive input numbers or character information, and generate signal input of a keyboard, a mouse, a joystick, or an optical trackball in relation to user settings and functional control. Specifically, the input unit 130 may include a touch sensitive surface 131 and any other input device 132. The touch sensitive surface 131, which is also called a touch screen or a touchpad, can gather a touch operation (for example, operations by use of a finger of a user, a stylus, and any other suitable object or attachment on or near the sensitive surface 131) applied on or near to the touch sensitive surface 131 by the user and drive a connected device according to preset programs. Optionally, the touch sensitive surface 131 may include a touch-sensitive device and a touch controller. The touch-sensitive device detects a direction of the user's touch, detects signals resulted from the touch operation, and transmits the signals to the touch controller. The touch controller receives information of the touch from the touch-sensitive device, converts it into a touch coordinate, further transmits the coordinate to the processor 180, and further receives and executes an instruction from the processor 180. Furthermore, the touch sensitive surface 131 may be implemented by utilizing capacitive, resistive, infrared, and surface acoustic wave technologies. In addition to the touch sensitive surface 131, the input unit 130 may further include any other input device 132. Specifically, the input device may include but not limited to one or any of the combination of a physical keyboard, function keys (such as volume control keys, switch keys, etc.), a trackball, a mouse, and a joystick.

The display unit 140 may be configured to display information inputted by the user, information provided for the user, or various types of graphical user interfaces of the mobile terminal 100. The graphical user interfaces may include a graph, a text, an icon, a video, and any combination of them. The display unit 140 may include a display panel 141, optionally, which may be a liquid crystal display (LCD) or an Organic Light-Emitting Diode (OLED) display. Furthermore, the touch sensitive surface 131 may cover the display panel 141. When the touch sensitive surface 131 detects a touch operation on or near the touch sensitive surface 131 and transmits a corresponding signal to the processor 180 to determine a type of the touch event, the processor 180 controls the display panel 141 to provide appropriate visual output according to the type of the touch event. Although the touch sensitive surface 131 and the display panel 141 in the figure are two separate components for implementing input and output functions, the touch sensitive surface 131 and the display panel 141 may be integrated into one component for implementing the input and output functions in some embodiments.

The mobile terminal 100 may further include at least one sensor 150, such as a light sensor, a motion sensor, and other sensors. Specifically, the light sensor can include an ambient light sensor and a proximity sensor. The ambient light sensor can adjust the brightness of the display panel 141 according to bright or dark as to the ambient light. The proximity sensor can generate an interrupt when a cover is closed or turned off. As one type of the motion sensor, a gravity sensor (G-sensor) can detect acceleration speed on all directions (generally up to three axis), can detect magnitude and direction of the gravity when it stays still, and can identify a gesture in a cell phone application (such as a screen switch between landscape style and portrait style, relevant games, and magnetometer calibration) and recognize vibration patterns to identify relevant functions (such as pedometer, and knock), and so on. Additionally, a gyroscope, a barometer, a hygrometer, a thermometer, an infrared sensor, and any other sensor can be deployed in the mobile terminal 100, and the details for these are not repeated herein.

The audio circuit 160, a speaker 161, and a microphone 162 provide an audio interface between the user and the mobile terminal 100. The audio circuit 160 converts received audio data to an electrical signal and transmits the electrical signal to the speaker 161. The speaker 161 converts the electrical signal to sound signals and outputs the sound signals. In addition, the microphone 162 converts collected sound signal to an electrical signal. The audio circuit 160 converts the electrical signal to audio data and transmits the audio data to the processor 180 for further processing. After the processing, the audio data may be transmitted to another terminal via the RF circuit 110, or transmitted to the storage 120 for further processing. The audio circuit 160 may further include an earphone jack for providing communication between an external earphone and the mobile terminal 100.

By the transmission module 170 (such as a WIFI module), the mobile terminal 100 can help a user receive a request, send a message and so on. It provides the user with wireless broadband internet access. Although the transmission module 170 is illustrated in the figure, it can be understood that this module is not an essential component for the mobile terminal 100 and can be omitted according to needs without departing from the scope of the present invention.

The processor 180 functions as a control center of the mobile terminal 100 and is configured to connect each component of the cell phone using various interfaces and circuits, and is configured to execute the various functions of the mobile terminal 100 and to perform data processing by running or executing the software programs and/or modules stored in the storage 120 and calling the data stored in the storage 120, thereby monitoring the overall mobile terminal. Optionally, the processor 180 can include one or more processing cores. In some embodiments, an application processor and a modulation/demodulation processor can be integrated to form the processor 180. The application processor is primarily configured to process an operating system, user interfaces, application programs, and so on. The modulation/demodulation processor is primarily configured to process wireless communication. It should be understood that the modulation/demodulation processor can be independent from the processor 180.

The mobile terminal 100 further includes the power supply 190 configured to provide power for the various components of the mobile terminal 100. In some embodiments, the power supply can be logically coupled to the processor 180 via a power management system that controls charging, discharging, power consumption, and so on. The power supply 190 may further include one or more direct current (DC)/or alternating current (AC) power sources, recharging system, power failure detection circuit, power converter or inverter, power supply status indicator, and the like.

Although not being shown, the mobile terminal 100 may include a camera (such as a front camera and a rear camera), a BLUETOOTH module, and so on. They are not repeated herein. Specifically, in the present embodiment, the display unit of the mobile terminal 100 is a touchscreen display.

In addition to above embodiments, there may have other implementations for the present invention. Those using equal or equivalent solutions by replacement are within the scope of the present invention.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

The invention claimed is:

1. A driving circuit, applied to a display panel, the display panel comprising pixel units and data lines, the driving circuit comprising:

a plurality of circuit units connected in series, each of the circuit units comprising a plurality of voltage dividing resistors connected in parallel, wherein the plurality of voltage dividing resistors comprise a first resistor and a second resistor, a resistance of the first resistor is less than the resistance of the second resistor, the plurality of circuit units divide a plurality of first reference voltages into a plurality of divided voltages corresponding to a plurality of grayscales, and the divided voltages are provided for the pixel units via the data lines; and a controller, configured to select the first resistor of at least one selected circuit unit to be connected from the plurality of circuit units based on a current-frame grayscale of the data line, and select the second resistor of the selected circuit unit to be connected when the pixel unit needs to be driven by a second reference voltage;

wherein when there are a plurality of second resistors, the controller is further configured to determine a target voltage dividing resistor from the plurality of second resistors of the selected circuit unit based on a grayscale voltage difference between the current-frame grayscale and a previous-frame grayscale of the data line, and select the target voltage dividing resistor to be connected when the pixel unit needs to be driven by the second reference voltage.

2. The driving circuit of claim 1, wherein the controller is configured to determine the target voltage dividing resistor from the plurality of second resistors based on a voltage difference threshold corresponding to the grayscale voltage difference.

3. The driving circuit of claim 1, wherein there is at least one previous circuit unit having the first resistor that is connected under the previous-frame grayscale, and the controller is configured to calculate the grayscale voltage difference based on the first resistor of the previous circuit unit and the first resistor of the selected circuit unit.

4. The driving circuit of claim 1, wherein the resistance of the plurality of second resistors differs by a preset threshold and sequentially increases.

5. The driving circuit of claim 1, wherein when there are a plurality of selected circuit units, the controller is further configured to determine at least one target circuit unit from the plurality of selected circuit units based on a grayscale level difference between the current-frame grayscale and a previous-frame grayscale of the data line, and select the second resistor of the target circuit unit to be connected when the pixel unit needs to be driven by the second reference voltage.

6. The driving circuit of claim 1, wherein the controller is further configured to select the first resistor of the selected circuit unit to be connected after the pixel unit is driven by the second reference voltage and a voltage of the pixel unit arrives at a target pixel voltage value such that the pixel unit is driven by the divided voltage.

7. A driving method of a driving circuit, applied to a display panel, the display panel comprising pixel units and data lines, the driving circuit comprising a plurality of circuit units connected in series, each of the circuit units comprising a plurality of voltage dividing resistors connected in parallel, the plurality of voltage dividing resistors comprising a first resistor and a second resistor, a resistance of the first resistor being less than the resistance of the second resistor, the driving method comprising:

obtaining an over-driving instruction, which carries information indicating that the pixel unit needs to be over driven; and in response to the over-driving instruction, switching a connected voltage dividing resistor in a selected circuit unit under a current-frame grayscale from the first resistor to the second resistor such that the pixel unit is over driven;

wherein when there are a plurality of second resistors, and the step of switching the connected voltage dividing resistor in the selected circuit unit under the current-frame grayscale from the first resistor to the second resistor comprises:

calculating a grayscale voltage difference between the current-frame grayscale and a previous-frame grayscale of the data line;

determining a target voltage dividing resistor from the plurality of second resistors of the selected circuit unit under the current-frame grayscale based on the grayscale voltage difference; and switching the connected voltage dividing resistor in the selected circuit unit from the first resistor to a target voltage dividing resistor.

8. The driving method of claim 7, wherein there is at least one previous circuit unit having the first resistor that is connected under the previous-frame grayscale, and the step of calculating the grayscale voltage difference between the current-frame grayscale and the previous-frame grayscale of the data line comprises:

calculating the grayscale voltage difference based on the first resistor of the previous circuit unit and the first resistor of the selected circuit unit.

9. The driving method of claim 7, wherein the step of determining the target voltage dividing resistor from the plurality of second resistors of the selected circuit unit under the current-frame grayscale based on the grayscale voltage difference comprises:

determining a voltage difference threshold corresponding to the grayscale voltage difference; and determining the target voltage dividing resistor from the plurality of second resistors of the selected circuit unit under the current-frame grayscale based on the voltage difference threshold.

10. The driving method of claim 7, wherein the resistance of the plurality of second resistors differs by a preset threshold and sequentially increases.

11. The driving method of claim 7, wherein there are a plurality of selected circuit units, and the step of switching the connected voltage dividing resistor in the selected circuit unit under the current-frame grayscale from the first resistor to the second resistor comprises:

calculating a grayscale level difference between the current-frame grayscale and a previous-frame grayscale of the data line;

determining at least one target circuit unit from the plurality of selected circuit units under the current-frame grayscale based on the grayscale level difference; and switching the connected voltage dividing resistor in the target circuit unit from the first resistor to the second resistor.

12. The driving method of claim 7, wherein after the step of switching, in response to the over-driving instruction, the connected voltage dividing resistor in the selected circuit unit under the current-frame grayscale from the first resistor to the second resistor such that the pixel unit is over driven, the method further comprising:

arriving, by a voltage of the pixel unit, at a target pixel voltage value; and switching the connected resistor in the selected circuit unit from the second resistor to the first resistor.

13. A mobile terminal, comprising a driving circuit applied to a display panel, the display panel comprising pixel units and data lines, the driving circuit comprising:

a plurality of circuit units connected in series, each of the circuit units comprising a plurality of voltage dividing resistors connected in parallel, wherein the plurality of voltage dividing resistors comprise a first resistor and a second resistor, a resistance of the first resistor is less than the resistance of the second resistor, the plurality of circuit units divide a plurality of first reference voltages into a plurality of divided voltages corresponding to a plurality of grayscales, and the divided voltages are provided for the pixel units via the data lines; and a controller, configured to select the first resistor of at least one selected circuit unit to be connected from the plurality of circuit units based on a current-frame grayscale of the data line, and select the second resistor of the selected circuit unit to be connected when the pixel unit needs to be driven by a second reference voltage;

wherein when there are a plurality of second resistors, the controller is further configured to determine a target voltage dividing resistor from the plurality of second resistors of the selected circuit unit based on a grayscale voltage difference between the current-frame grayscale and a previous-frame grayscale of the data line, and select the target voltage dividing resistor to be connected when the pixel unit needs to be driven by the second reference voltage.

14. The mobile terminal of claim 13, wherein the controller is configured to determine the target voltage dividing resistor from the plurality of second resistors based on a voltage difference threshold corresponding to the grayscale voltage difference.

15. The mobile terminal of claim 13, wherein there is at least one previous circuit unit having the first resistor that is connected under the previous-frame grayscale, and the controller is configured to calculate the grayscale voltage difference based on the first resistor of the previous circuit unit and the first resistor of the selected circuit unit.

16. The mobile terminal of claim 13, wherein the resistance of the plurality of second resistors differs by a preset threshold and sequentially increases.

17. The mobile terminal of claim 13, wherein when there are a plurality of selected circuit units, the controller is further configured to determine at least one target circuit unit from the plurality of selected circuit units based on a grayscale level difference between the current-frame grayscale and a previous-frame grayscale of the data line, and select the second resistor of the target circuit unit to be connected when the pixel unit needs to be driven by the second reference voltage.

* * * * *